United States P

Davis

Re. 28,726

Mar. 2, 1976

[54] VEHICLE WHEEL MANUFACTURING APPARATUS

[76] Inventor: Dalton M. Davis, 3433 Via La Selva, Palos Verdes Estates, Calif. 90274

[22] Filed: Mar. 22, 1974

[21] Appl. No.: 453,688

Related U.S. Patent Documents

Reissue of:

[64] Patent No.: 3,725,992
Issued: Apr. 10, 1973
Appl. No.: 123,329
Filed: Mar. 11, 1971

[52] U.S. Cl. ..... 29/208 D; 29/159.01; 29/DIG. 3
[51] Int. Cl.[2] ..... B23P 19/04
[58] Field of Search ..... 29/208 D, 159.01, 159.03, 29/DIG. 3, 200 B, 200 R

[56] References Cited

UNITED STATES PATENTS

| | | | |
|---|---|---|---|
| 1,765,757 | 6/1930 | Burger | 29/159.03 X |
| 2,713,197 | 7/1955 | Schmidt | 29/DIG. 3 |
| 3,333,319 | 8/1967 | Taylor | 29/159.01 |

FOREIGN PATENTS OR APPLICATIONS

| | | | |
|---|---|---|---|
| 1,287,490 | 8/1972 | United Kingdom | 29/159.01 |

*Primary Examiner*—Victor A. DiPalma

[57] ABSTRACT

A vehicle wheel manufacturing apparatus to connect a wheel rim and a spider by accurately press fitting the spider into the rim and then cold working portions of the rim into a plurality of depressions within the periphery of the spider. The cold working is accomplished by a separate actuator for each portion with the manifold assembly connecting together all of the actuators so the actuators will all act simultaneously.

16 Claims, 11 Drawing Figures

INVENTOR.
DALTON M. DAVIS
BY
JACK C. MUNRO
AGENT

INVENTOR.
DALTON M. DAVIS

BY
JACK C. MUNRO
AGENT

INVENTOR.
DALTON M. DAVIS
BY
JACK C. MUNRO
AGENT

INVENTOR.
DALTON M. DAVIS

BY
JACK C. MUNRO
AGENT

VEHICLE WHEEL MANUFACTURING APPARATUS

Matter enclosed in heavy brackets [ ] appears in the original patent but forms no part of this reissue specification; matter printed in italics indicates the additions made by reissue.

BACKGROUND OF THE INVENTION

The field of this invention relates to inflatable tire supporting structures and more particularly to an improved machine to manufacture the tire supporting structure.

It has been common practice for a great number of years to mount the inflatable tire of a vehicle upon a steel rim, and then to secure the steel rim to the wheel drum of an automobile. Normally, such steel rims were formed as an integral unit in a rough cast form. In an effort to improve the spider section of the wheel, the section centrally located with respect to the rim, it has been common to employ the use of a hubcap which is designed to be ornamental and pleasing to the eye. A large number of different types of hubcaps of various designs have been employed in the past.

Within the past few years it has been common to make ornamental the spider portion of the wheel itself, thereby eliminating the need for a hubcap. It has been found that if the spider is formed of a non-ferrous metal such as aluminum or magnesium, the spider is more receptive to styling by chrome plating than a steel spider. However, it has not been particularly easy to establish a strong, leakage free connection between the non-ferrous spider and the ferrous rim.

Most such rims are to support a tubeless tire wherein the rim must establish an airtight connection with the tire. It has been common practice in the past to rivet the rim to the spider. As a result, it has been common that a non-perfect riveting causes the pressurized air within the tire to leak out past the rivet. Also, although a satisfactory rivet connection may be initially established, after a period of time it may loosen permitting air to leak from the tire.

In an effort to overcome the use of rivets, there have been numerous attempts at welding the spider to the rim. However, the welding of a ferrous metal to a non-ferrous metal is not easily accomplished even by the most skilled artisan. Further, the welding technique is inherently time consuming. The cost of manufacture of such wheel assemblies is substantially increased when using the welding technique.

Because of the high precision required in the manufacture by either the rivet method or the welding method of vehicle wheel assemblies, it has been extremely difficult to design a machine to automatically manufacture such a vehicle wheel assembly. In the past it has been common to manufacture such vehicle wheel assemblies by employing the use of only portable hand held tools. Such manufacturing techniques are extremely time consuming and, as a result, are extremely costly as to labor. Also, because of the possibility of human error, inaccuracies in manufacturing by such portable tools frequently results in the producing of a high percentage of failures.

SUMMARY OF THE INVENTION

The manufacturing apparatus of this invention is designed to facilitate the securing of a non-ferrous spider within a ferrous rim of an inflatable tire wheel assembly. The spider includes a plurality of depressions spaced around the peripheral surface of the spider. The depressions are preferably formed substantially cone shaped with the side walls of the depressions being at a 45 degree angle with the circumferential spider wall. The rim is first centrally located about a piston rod. The spider is then located about the piston rod and upon actuation of the piston associated with the piston rod, the spider is forced into an interference fit within the rim. A plurality of male dimpling tools surround the rim in particular locations. Each of the male dimpling tools are movable between a retracted position and an extended position by means of an hydraulic actuator. The male dimpling tools are to be divided into groups with each group being fixedly supported with respect to the apparatus housing by means of a manifold. The actuators for each of the male dimpling tools are to be actuated simultaneously, or substantially simultaneously, which causes sections of the rim to be compressed simultaneously within each of the depressions within the spider. The depressing of the rim into the depressions of the spider is to be such as to cause the steel rim to flow plastically but not fracture. It is normally envisioned that approximately 15 depressions are to be formed in a spaced apart relationship about the spider. The rim is to be cold worked within each of the depressions. As a result, a substantially integral high strength unit is formed between the spider and the rim.

DETAILED DESCRIPTION OF THE SHOWN EMBODIMENT

Figure 1:
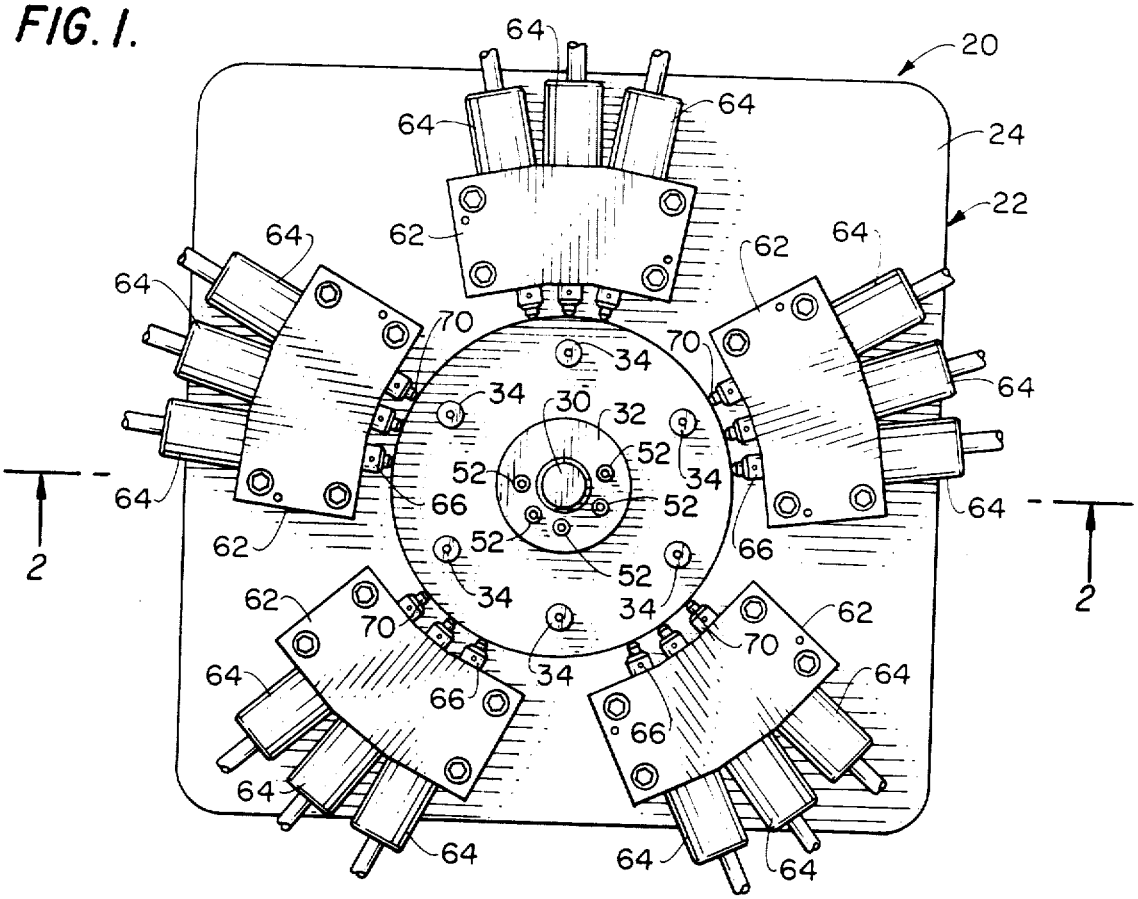
FIG. 1 is a plan view of the manufacturing apparatus of this invention.
Figure 2:
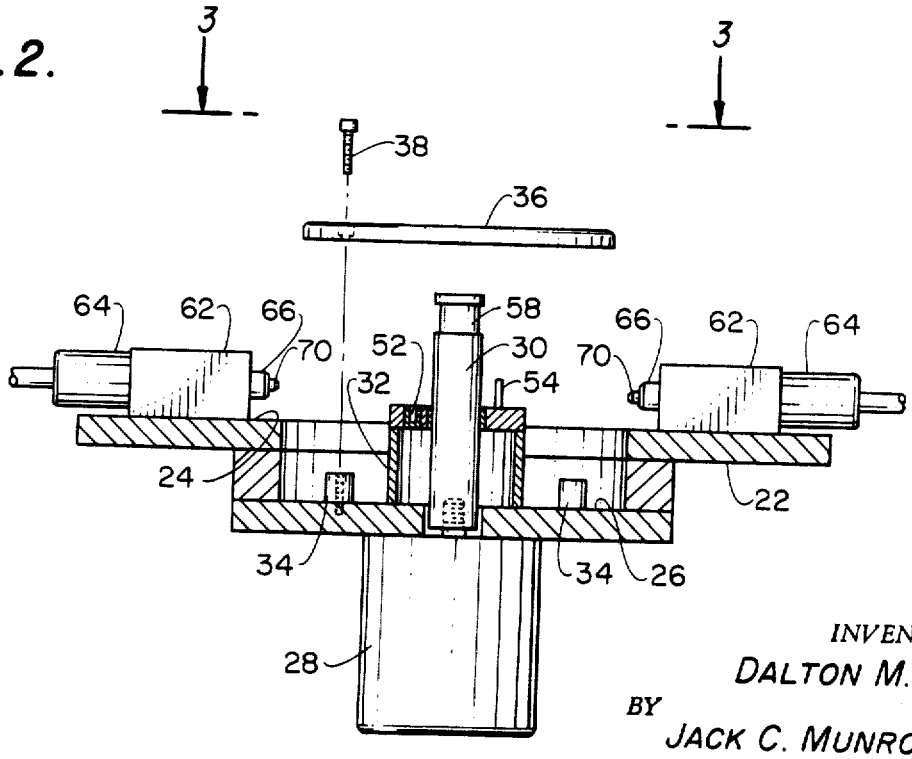
FIG. 2 is a cross sectional view of the manufacturing apparatus of this invention taken along line 2—2 of FIG. 1.
Figure 3:
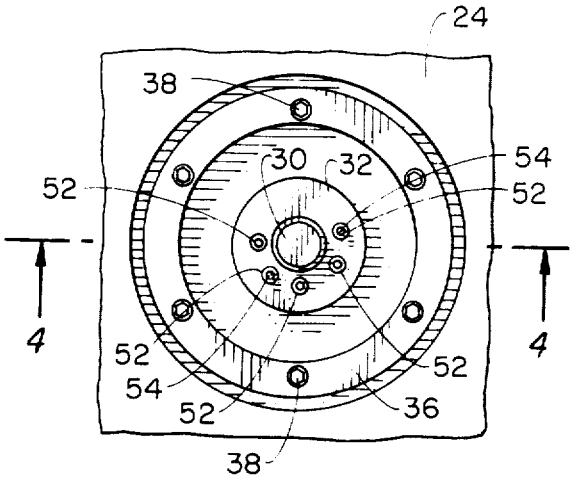
FIG. 3 is a fragmentary plan view of a portion of the manufacturing apparatus of this invention taken along lines 3—3 of FIG. 2.
Figure 5:
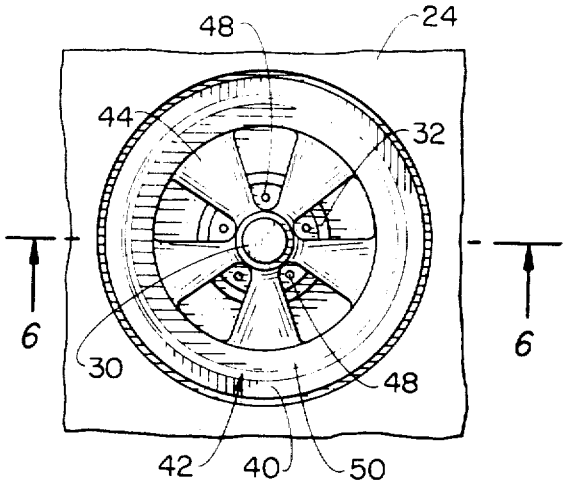
FIG. 5 is a fragmentary plan view taken along line 5—5 of FIG. 4.
Figure 4:
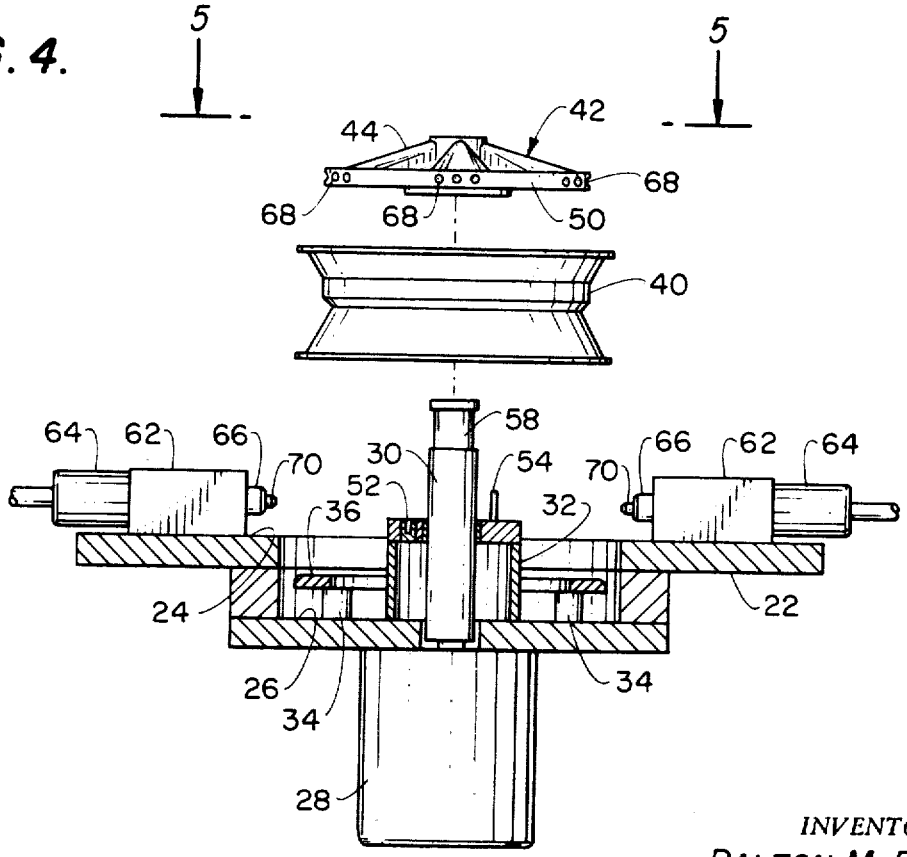
FIG. 4 is a view similar to FIG. 2 showing the locating procedure for the rim and the spider.

Referring particularly to the drawings, shown in FIG. 1 is the manufacturing apparatus 20 of this invention being mounted upon a base or housing 22 which is to be fixed to a floor or ground (not shown). The housing 22 includes an upper planar surface 24 which surrounds a cylindrical shaped well 26 formed within the housing 22.

Fixedly secured to the underside of the well 26 is an actuator housing 28. The actuator housing 28 includes a piston (not shown) which is to be movable by means of a source of compressed air (not shown). The piston within the actuator housing 28 is fixedly connected to the piston rod 30. The piston rod 30 is slidingly guided by means of a bearing within an upstanding housing 32. Housing 32 is fixedly secured to the housing 22 within the well 26.

A plurality of plugs 34 are to be locatable in a concentric circle within the well 26 about the upstanding housing 32. Normally, six in number of such plugs 34 are employed equidistantly spaced apart within the well 26. However, the number of such plugs 34 and their particular spacing is to be considered a matter of choice or design. A ring 36 is adapted to rest upon the plugs 34. A bolt 38 is employed to pass through the ring 36 and a plug 34 to secure such to the housing 34. Upon the tightening of all the bolts 38, the ring and the plugs 34, in essence, become integral with the housing 32.

The rim 40, which is to support the inflatable tire of the vehicle (not shown), is to rest upon the ring 36 which is supported upon the plugs 34. The plugs 34 are selected along with the selection of the diameter of the ring 36 to locate the particular rim 40 at a specific height within the apparatus 20. In other words, the apparatus 20 of this invention is designed to facilitate the connecting of a spider 42 within numerous rim sizes. In other words, some vehicles are adapted to employ a 15 inch diameter rim, while other vehicles may employ a 14 inch diameter rim. The apparatus 20 of this invention is designed to facilitate the connection of a spider 42 within any of several sizes of rims 40 by the mere employing of different size plugs 44 and different diameter rings 36. The rim 40 is normally composed of a ferrous material such as steel or steel alloy.

The spider 42 may assume many of numerous configurations, the spoke configuration being selected for illustrative purposes. Basically, the spider 42 includes a plurality of spokes 44 which are equiangularly spaced from each other and extend radially from a hub aperture 46 and are to facilitate attachment of the spider 42 and its associated rim 40 to the drive drum of a vehicle such as an automobile. An annular element 50 is integrally connected to the free end of each of the spokes 44 and is concentrically disposed with respect to the central hub aperture 46. It is to be noted that the entire spider 42 is to be formed of a non-ferrous material such as aluminum, magnesium, or alloys thereof. However, it is to be understood that the manufacturing apparatus of this invention could readily be employed upon ferrous materials of the spider 42.

Figure 6:
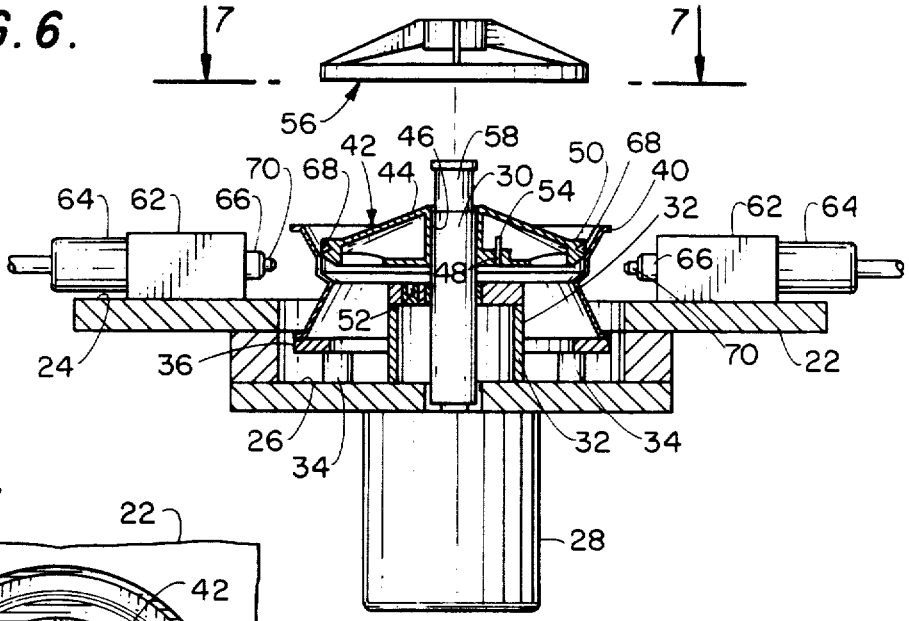
FIG. 6 is a cross sectional view similar to FIG. 4 showing the apparatus of this invention in a succeeding intermediate position prior to connection of the spider within the rim.
Figure 7:
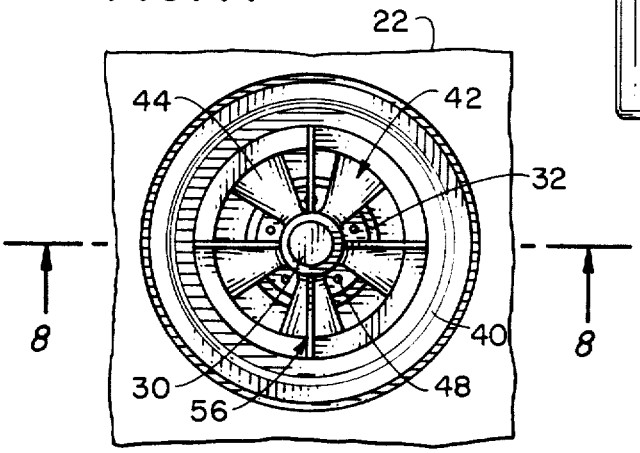
FIG. 7 is a fragmentary plan view taken along line 7—7 of FIG. 6.

Formed within the upper surface of the upstanding housing 32 are a plurality of openings 52. Each of the openings 52 are adapted to receive a pin 54. Each pin is adapted to cooperate within a respective mounting hole 48 of the spider 42. It is envisioned that two (in number) of such pins 42 will be employed with two mounting holes 48 to support each spider 42. It is desired that two be employed because it is extremely important to firmly position the spider 42 in a concentric relationship with respect to the rim 40. It is to be noted that more than two in number of such openings 52 are shown within the upstanding housing 32. The reason for this is that a pin can be located in two particular openings 52 to cooperate with a specific type of spider 42 which has a particular mounting hole diameter 48. In other words, some mounting hole diameters are 4½ inches, some are 4¾ inches, and some are 5 inches. It is to be noted that the pins 54 of sufficient length so as to cooperate with the mounting holes 48 with the spider 42 in the position shown in FIG. 6 of the drawings.

The outer diameter of the spider 42, in other words, annular element 50, should be of such a dimension as to establish a press fit (or interference fit) with the inner diameter of the rim 40. It is actually been found to be best that not only a snug fit occur between the rim 40 and the spider 42, but it is required that the spider 42 be forcibly inserted within the rim 40 prior to the dimpling operation, which will be described further on in this specification.

In order to establish the press fit between the spider 42 and the rim 40, the compression ring 56 is adapted to be placed about the piston rod 30 with the periphery of the compression ring 56 being in abutting contact with the annular element 50 of the spider 42. A cut-away portion 58 is formed upon the piston rod 30 adjacent the upper end thereof. A U-shaped washer 60 is adapted to cooperate with the cut-away portion 58 and be in abutting contact with the upper surface of the compression ring 56.

Fixedly secured to the upper surface 24 of the housing 22 are a plurality of manifolds 62. Actually, five in number of such manifolds 62 are shown. However, the exact number and arrangement of the manifolds 62 is considered to be a matter of choice or design.

Each of the manifolds 62 are basically a block upon which are located three in number of longitudinal passages (not shown). The center line of each of the longitudinal passages is on a radius of the longitudinal axis of the piston rod 30. Each of the longitudinal passages retains a hydraulic actuator 64. Each of the hydraulic actuators 64 are to be supplied hydraulic fluid from a source (not shown). It is normally desired that the hydraulic fluid be supplied from a single source to all the actuators 64. However, such is not absolutely necessary as numerous sources could be employed.

Each of the hydraulic actuators are capable of effecting longitudinal movement of a male dimpling tool 66. The exact construction of each of the actuators 64 is deemed to be conventional and need not be described here in detail.

Formed within the annular element 50 about its periphery are a plurality of inwardly extending, radially located depressions 68. It is to be noted that there are preferably three in number of such depressions 68 adjacent each spoke 44. Since there are five in number of such spokes employed, there are 15 such depressions 68 formed within the annular element 50. However, it is to be understood that the number of the depressions 58 is to be strictly a matter of choice or design.

The depressions 68 may also assume any basic configuration. However, the inventor has found that if the walls of the depressions are located substantially at a 45 degree angle with respect to the outer surface of the annular element 50, best results are obtainable. The cross sectional configuration of each depression 68 is basically in the shape of a circle. One of the best ways in which to form to the depressions 68 is by means of the tip portion of a conventional drill bit. The forming of each of the depressions 68 is accomplished prior to the placing of the spider 42 in cooperation with the rim 40 by means of the apparatus 20 of this invention.

Each of the male dimpling tools 66 is substantially circular in configuration and includes a head 70 which is substantially circular in configuration and is of a size substantially equal to the largest circular dimension of the depression 68. The end of the head 70 is relieved generally in the form of a chamfer 72. Generally, this chamfer 72 forms a 45 degree angle with the cylindrical side wall of the head 70. The head 70 is to be forcibly moved by means of its respective actuator 64 to deform a portion of the rim 40 into its respective depression 68. It is to be understood that the locations of each of the tools 66 (by the manifolds 62) is such that it will respectively cooperate with a depression 68 during operation thereof. Care must be taken so the force of moving the head 70 in cooperation with its respective depression 68 will not be so great so as to cause the ferrous material of the rim 40 to exceed its plastic range. In other words, care must be taken so that any fracture, even though very minute, will not occur in the rim 40 during the dimpling operation. The reason for this is that even the smallest crack will permit leakage of the air from within the tire which is supported about the rim 40.

The dimpling operation is to be such to effect a cavity 74 within the outer surface of the rim 40 which is formed by permanent cold working of the rim material to extend partially within each depression 68. It is to be noted that there will be inherently produced a reduction in area of the rim material adjacent the outer circumference of the depression 68. But at the apex of the cavity 74, a small amount of reduction in area occurs or actually no reduction. This is very desirable as normally if a fracture was to occur on the rim 40, it would first occur in the area of the apex of the cavity 74. It has been found that by using this particular 45 degree relationship, extremely small or practically no reduction of the apex of the cavity occurs.

Although the 45 degree angle is described as being preferable, it has been found that satisfactory results can be achieved if the angle is anywhere between 23° to 45°. Generally, if the angle exceeds 45°, there is a greater tendency for the rim 40 to fracture during the dimpling operation. At lower angles (less than 23°) the connection established between the spider 42 and the rim 40 is normally not sufficient to withstand an impact test. In other words, under an impact test, the connection will fail prior to the spider failing. With the 45 degree angle employed, the connection is so strong between the rim 40 and the spider 42 that the spider itself fails prior to the connection failure.

The operation of the apparatus of this invention 20 is as follows: It will be presumed that the operator desires to effect the securing of a particular spider 42 within a particular rim 40. The operator then selects the particular desired length of the plugs 34 and the particular desired diameter of the ring 36 for the particular rim size. The plugs 34 are positioned as desired within the well 26 and the ring 36 so located thereupon. The bolts 38 are then installed with the entire unit of plugs 34 and ring 36 being made integral with respect to the housing 22. The operator then locates the pins 54 within their desired opening 52 for the particular diameter of the mounting hole 48. The operator then grasps the rim 40 and places such about the piston rod 30 into abutting contact with the ring 36. The operator then takes a spider 42 and also places such around the piston rod 30 so that two mounting holes 48 of the spider cooperate with a pin 54. The operator then places the compression ring 56 about the piston rod 30 and then locates the U-shaped washer 60 within the cut-away portion 58 of the piston 40 30.

At this time, the operator then effect actuation of the pneumatic piston within the actuator housing 28. Downward longitudinal movement of the piston rod 30 causes an appropriate downward movement of the washer 60 and the compression ring 56 and the spider 42. As a result, the spider 42 is press fitted within the proper section of the rim 40. The spider 42 is caused to move downward until it comes into abutting contact with the upper surface of the upstanding housing 32. It is to be noted that because of the pins 54, each of the depressions 68 are now in the particular desired alignment to cooperate with its respective tool 66.

The downward force of the actuator within the actuator housing 28 is permitted to remain in effect during the dimpling operation which will now be described. Such maintenance of the downward force insures that the exact position of the rim is maintained to achieve the best dimpling results.

The operator then effects actuation of the source of hydraulic fluid to apply hydraulic fluid to each of the hydraulic actuators 64. As a result, the tool 66 associated with each actuator 64 is caused to move longitudinally into contact with the rim 40. It is estimated that each of the hydraulic actuators 64 forces its respective tool 66 at a value between 5,000 psi and 7,500 psi to effect the dimpling operation. Each of the cavities 74 are formed at substantially the same time forming the integral bonded unit between the rim 40 and the spider 42.

Figure 8:
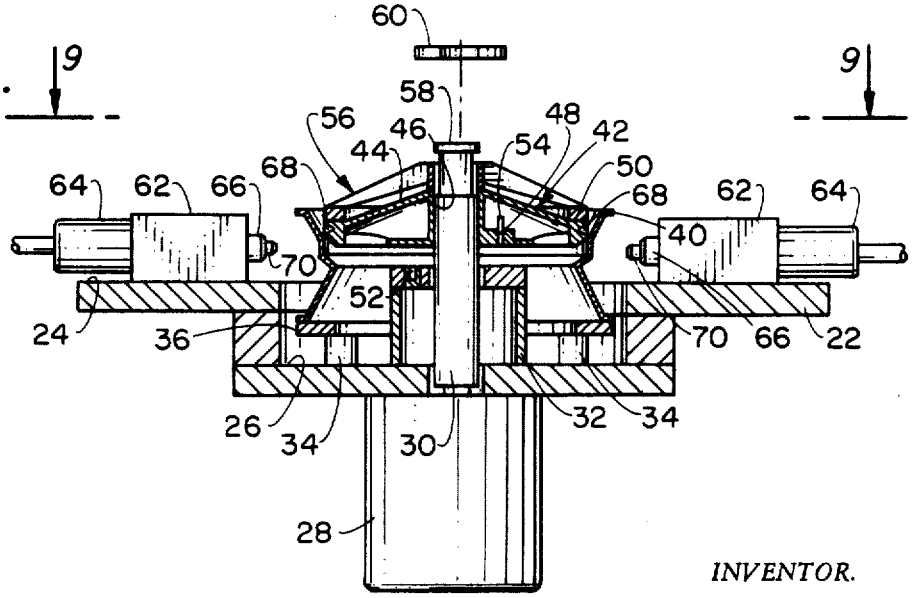
FIG. 8 is a view similar to FIG. 6 showing the structure in a further succeeding position prior to effecting connection of the spider within the rim.
Figure 9:
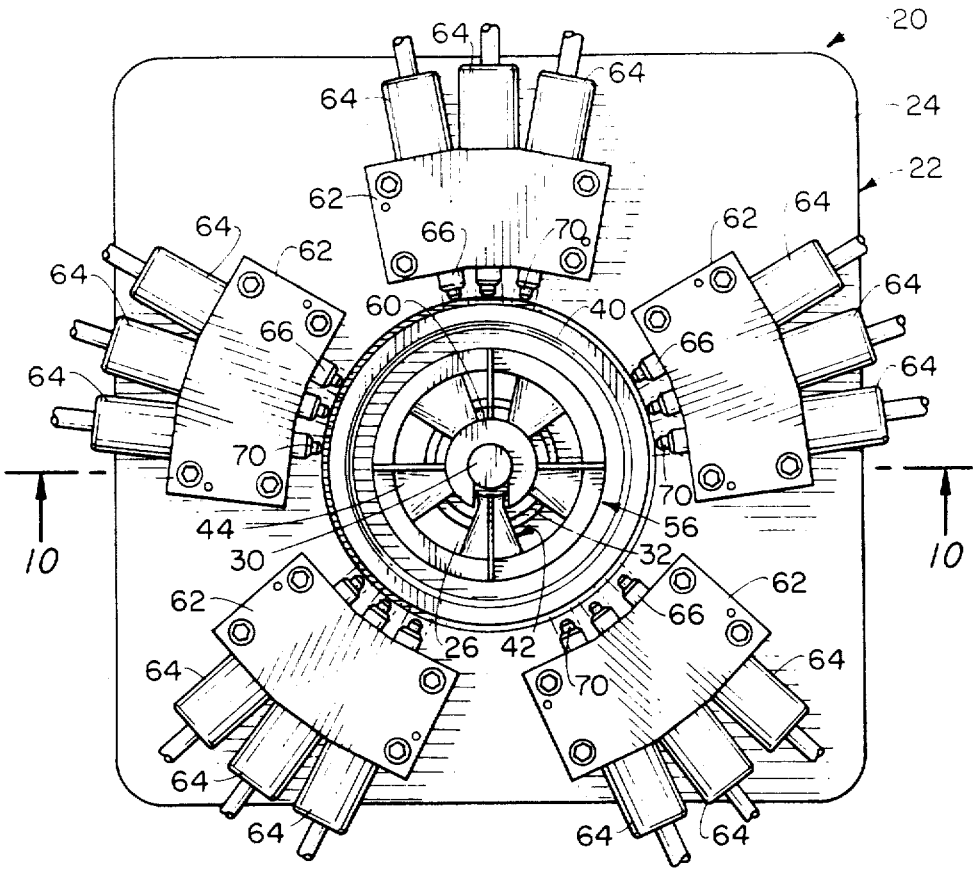
FIG. 9 is a plan view of the completely assembled apparatus of this invention taken along line 9—9 of FIG. 8.
Figure 10:
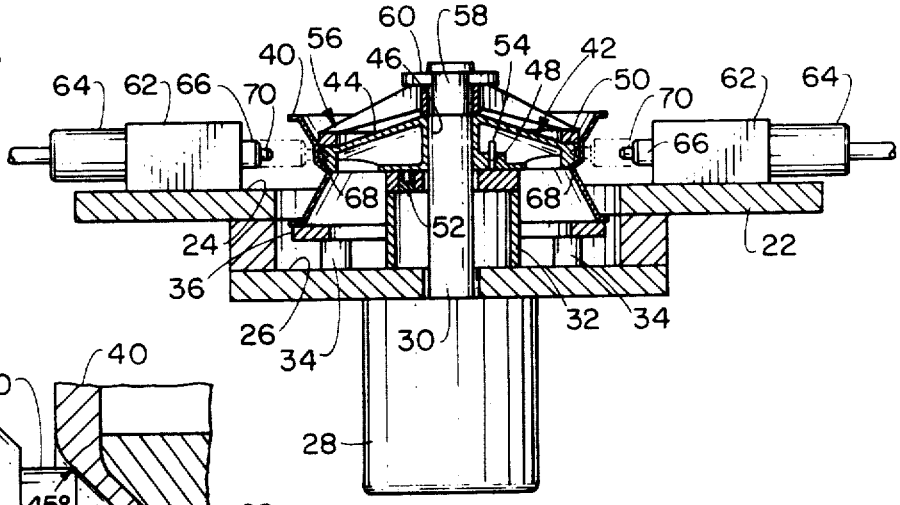
FIG. 10 is a cross sectional view of the apparatus of this invention taken along line 10—10 of FIG. 9 showing the spider being press fitted within the rim.
Figure 11:
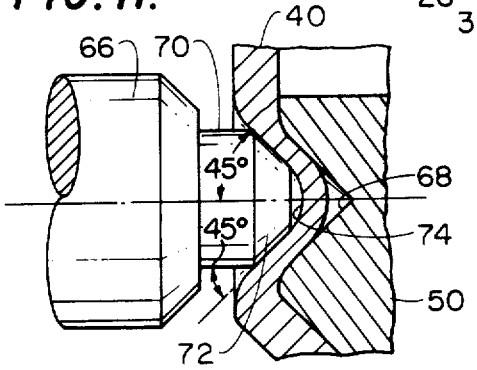
FIG. 11 is an enlarged cross sectional view of the male dimpling tool employed to effect the drilling operations within this invention.

Because of the substantial force that is generated by the hydraulic actuator 64 and transmitted to the spider 42, the hub portion of the spider must be supported or else a collapsing of the spider will occur or the spider will become out of round. It is for this reason, as shown in FIG. 8 of the drawings, that the piston rod 30 establishes a close fitting relationship within the hub aperture 46. In actual practice it is desired that the piston rod 30 be located within two or three thousandths of an inch within the hub aperture 46. As a result, the compression force of the hydraulic actuator 64 is transmitted directly through the spider and into the piston rod 30. The spider 42 is not then directly affected by the forces and therefore normally no breaking of the spider occurs or the spider does not become out of round.

The hub apertures 46 may vary in size for different size wheels. For different size hub apertures 46, different sizes of piston rod 30 may be employed so that the same close fitting relationship between the rod 30 and the spider 42 will occur. However, it will normally be desirable to employ only a single size rod 30, such size being the smallest size contemplated to be used. When a larger size hub aperture 46 is employed, a sleeve is to then be placed over the rod 30, said sleeve being of a size to establish a close fitting relationship with the particular hub aperture 46. It also fits closely about the rod 30. It is to be understood that there is to be various sizes of sleeves, each of which are to establish a close fit with a particularly sized hub aperture 46.

In the forming of some spiders 42, the hub aperture 46 may not be cylindrical but may be tapered so that the aft opening of the aperture 46 will be larger than the fore opening. In such an instance it is considered to be within the scope of this invention that the sleeves may have a tapered outer configuration in order to establish a close fit with the particular configuration of aperture 46. It is further considered to be within the scope of this invention that the outer configuration of the sleeve may assume an arcuate configuration including a spherical outer surface. Such an arcuate configuration would establish a line contact with the wall of the hub aperture 46. Normally such line contact will be sufficient to cause the forces to be transmitted to the rod 30 and prevent the spider 42 from collapsing or becoming otherwise damaged.

After forming the wheel assembly (composed of the rim 40 and the spider 42), the procedure is just reversed and the wheel assembly removed from the apparatus 20. Normally, this would be the final stage of manufacturing of the wheel assembly with wheel assembly now being ready for use.

It has been found that the manufacturing time to form such a wheel assembly by this invention would take approximately 30 seconds. This time interval is substantially quicker than previously known manufacturing methods. Also, because the manufacturing is accomplished automatically and independent of human error, an extremely accurate, failure free, wheel assembly is formed. After completion of the dimpling process of the apparatus 20 of this invention, there is no need for any additional welding or riveting, or any other extraneous operations prior to usage of the wheel assembly. In conclusion, the wheel assembly formed by the apparatus 20 of this invention results in the connecting of a ferrous rim to a non-ferrous spider which has higher strength characteristics than previously known methods.

What is claimed is:

[1. A vehicle wheel manufacturing apparatus to construct a vehicle wheel assembly, said assembly being composed of a rim to be capable of supporting an inflatable vehicle tire and a spider located interiorly of said rim, said manufacturing apparatus comprising:

first means to position said spider within said rim, said spider having hiatus structure located directly adjacent said rim; and second means to effect deformation of said rim into cooperation with said hiatus structure .]

[2. Apparatus as defined within claim 1 wherein:

said spider being of such a size that said spider must be forcibly inserted within said rim, said first means including an actuator to forcibly move said spider within said rim.]

[3. Apparatus as defined in claim 2 wherein: said actuator being actuated pneumatically.]

[4. Apparatus as defined within claim 1 including:

third means to support said rim within said apparatus, said third means being variable to support different sized rims.]

5. A vehicle wheel manufacturing apparatus to construct the vehicle wheel assembly, said assembly being composed of a rim to be capable of supporting an inflatable vehicle tire and a spider located interiorly of said rim, said manufacturing apparatus comprising:

a first means to position said spider within said rim, said spider having *formed therein* a plurality of *separate* depressions *arranged in a circumferential row about said spider* [formed therein and located directly adjacent said rim]; and second means to effect deformation of said rim into cooperation with said depressions, said second means includes an actuator assembly, said actuator assembly including a separate actuator for each of said depressions, a manifold assembly to connect together a plurality of said actuator to maintain such in a predetermined fixed relationship relative to said apparatus.

6. Apparatus as defined in claim 5 wherein:

each of said actuators having an actuating head to physically contact said rim and effect deformation thereof, each of said actuators to move its respective actuating head in a radial direction with respect to said rim.

7. Apparatus as defined in claim 5 wherein:

said manifold assembly includes a plurality of separate manifold units, each of said manifold units to retain three in number of said actuators.

8. Apparatus as defined in claim 7 wherein:

there being five in number of said manifold units being equidistantly spaced apart about said rim.

9. Apparatus as defined within claim 5 wherein:

said rim to be deformed plastically within said depression but not to exceed the ultimate strength of the rim material.

10. Apparatus as defined within claim 9 wherein:

said rim being in a circular configuration, said depressions being generally disposed in a radial direction with respect to said rim.

11. Apparatus as defined within claim 10 wherein:

the sidewall of each of said depressions forming substantially a 45 degree angle with respect to the exterior surface of said spider.

12. A vehicle wheel manufacturing apparatus to construct a vehicle wheel assembly, said assembly being composed of a rim to be capable of supporting an inflatable vehicle tire and a spider located interiorly of said rim, said manufacturing apparatus comprising:

first means to position said spider within said rim, said spider having *formed therein* a plurality of *separate* depressions *arranged in a circumferential row about said spider* [located directly adjacent said rim]; and second means to effect deformation of said rim into cooperation with said depressions.

13. Apparatus as defined within claim 12 wherein:

said spider being of such a size that said spider must be forcibly inserted within said rim.

14. Apparatus as defined within claim 12 including:

third means to support said rim within said apparatus, said third means being variable to support different size rims.

15. Apparatus as defined within claim 12 wherein:

said second means includes an actuator assembly, said actuator assembly including a separate actuator for each of said depressions.

16. Apparatus as defined within claim 15 including:

a manifold assembly to connect together a plurality of said actuators to maintain such in a predetermined fixed relationship relative to said apparatus.

17. Apparatus as defined within claim 12 wherein:

the side wall of each of said depressions forming substantially a 45 degree angle with respect to the exterior surface of said spider.

*18. A vehicle wheel manufacturing apparatus to construct a vehicle wheel assembly, said assembly being composed of a rim to be capable of supporting an inflatable vehicle tire and a spider located interiorly of said rim, said manufacturing apparatus comprising:*

*first means to position said spider within said rim, said spider having hiatus structure located directly adja-*

*cent said rim;*

*second means to effect deformation of said rim into cooperation with said hiatus structure; and*

*third means to support said rim within said apparatus, said third means being variable to support different sized rims.*

*19. Apparatus as defined in claim 18 wherein:*

*said spider being of such a size that said spider must be forcibly inserted within said rim, said first means including an actuator to forcibly move said spider within said rim.*

*20. Apparatus as defined in claim 19 wherein:*

*said actuator being actuated pneumatically.*

* * * * *

UNITED STATES PATENT OFFICE

CERTIFICATE OF CORRECTION

PATENT NO. : Reissue 28726
DATED : March 2, 1976
INVENTOR(S) : Dalton M. Davis

It is certified that error appears in the above-identified patent and that said Letters Patent are hereby corrected as shown below:

Column 4, line: After "pins 54" insert --are--.

Signed and Sealed this
Tenth Day of August 1976

[SEAL]

*Attest:*

RUTH C. MASON
*Attesting Officer*

C. MARSHALL DANN
*Commissioner of Patents and Trademarks*